US006751360B1

(12) United States Patent
Lu

(10) Patent No.: US 6,751,360 B1
(45) Date of Patent: Jun. 15, 2004

(54) FAST VIDEO TEMPORAL ALIGNMENT ESTIMATION

(75) Inventor: Jiuhuai Lu, West Linn, OR (US)

(73) Assignee: Tektronix, Inc., Beaverton, OR (US)

( * ) Notice: Subject to any disclaimer, the term of this patent is extended or adjusted under 35 U.S.C. 154(b) by 543 days.

(21) Appl. No.: 09/712,009

(22) Filed: Nov. 14, 2000

(51) Int. Cl.[7] .............................. G06K 9/36; G06K 9/64; H04N 7/12

(52) U.S. Cl. ................... 382/278; 382/236; 375/240.27

(58) Field of Search ................................. 382/278, 236, 382/238, 239, 232, 107; 348/412.1, 413.1, 414.1, 415.1, 416.1, 417.1, 418.1, 422.1, 429.1, 427.1, 430.1; 325/240.01, 240.26, 240.27, 240.28, 240.29, 254

(56) References Cited

U.S. PATENT DOCUMENTS 6,529,631 B1 * 3/2003 Peterson et al. ............ 382/232
6,549,643 B1 * 4/2003 Toklu et al. ................ 382/107

\* cited by examiner

*Primary Examiner*—Leo Boudreau
*Assistant Examiner*—Duy M. Dang
(74) *Attorney, Agent, or Firm*—Francis I. Gray

(57) ABSTRACT

A fast temporal alignment estimation method for temporally aligning a distorted video with a corresponding source video in order to perform accurate video quality measurements transforms each video into a corresponding signature curve by calculating a data point for each frame. The data points are calculated as a cross-correlation between a present frame and a subsequent frame in the video. The signature curves are then matched using a normalized cross-correlation algorithm to compute the temporal misalignment between the videos so that the video signals may be temporally aligned. Fast spatial alignment may then be performed and accurate video quality measurements made.

7 Claims, 1 Drawing Sheet

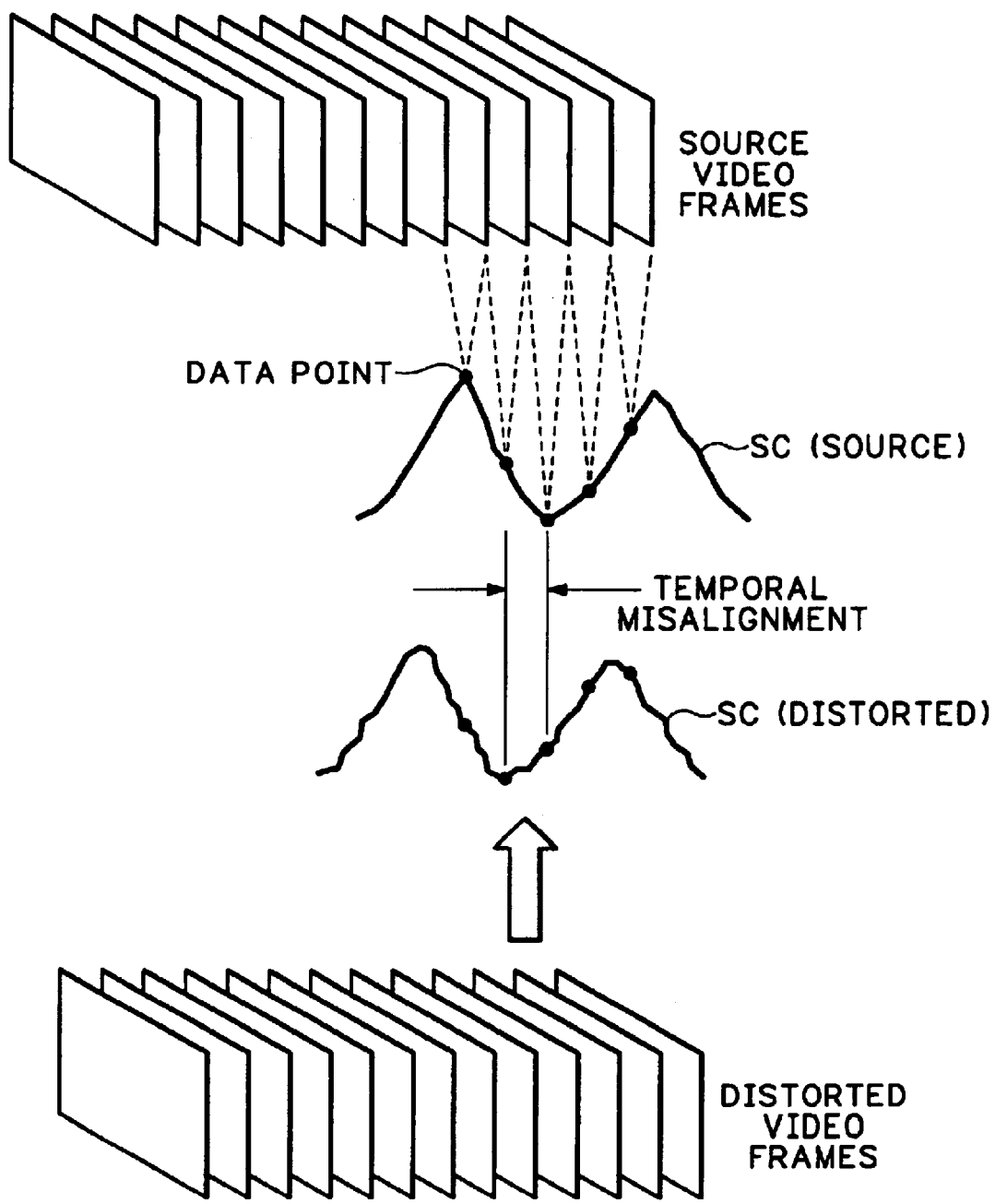

FAST VIDEO TEMPORAL ALIGNMENT ESTIMATION

BACKGROUND OF THE INVENTION

The present invention relates to video quality test and measurement products, and more particularly to a fast video temporal alignment estimation for aligning distorted and corresponding source videos.

Capturing of video encoding and transmission distortions is fundamental to video quality test and measurement products. In applications requiring accurate assessment of video quality, it is required that video distortions be measured by comparing a distorted video against the corresponding source of the video. One necessary requirement for such comparison to be made is that the distorted and source videos be perfectly aligned spatially and temporally. Typically the misalignment estimation is computationally costly as misalignments are detected by searching both a spatial and temporal match simultaneously in a three dimensional space, two spatial dimensions and one temporal. Due to the computational load most video quality test and measurement products operate in non-realtime.

What is desired is a fast video temporal alignment estimation method in order to perform video quality measurements accurately in realtime.

BRIEF SUMMARY OF THE INVENTION

Accordingly the present invention provides a fast video temporal alignment estimation method that is able to resolve temporal alignment independently without requiring the existence of a scene break or fast motion. A distorted video and its corresponding source video are both transformed into signature curves. A cross-correlation between consecutive frames in the video generates a data point for the signature curve, the accumulation of the data points for a video forming the signature curve for the video. Then the two signature curves are matched using a normalized cross-correlation technique, the maximum value of the cross-correlation indicating that the videos are aligned. After the temporal alignment then spatial alignment may be performed using any fast spatial alignment algorithm. The spatially and temporally aligned videos may then be processed by an appropriate instrument for video quality measurements.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is an illustrative view of a fast temporal alignment estimation method between distorted and source videos according to the present invention.

DETAILED DESCRIPTION OF THE INVENTION

The fast temporal alignment estimation method described here has two steps. First a video is collapsed into a one dimensional curve in which each video frame is represented by a single data point. As a result of this transform the source and distorted videos are converted into respective one dimensional curves. The one dimensional curve is a signature curve for the represented video. In the second step the signature curve for the distorted video is matched against the signature curve for the source video. The amount of misalignment between the two video sequences is then detected by calculating the misalignment between the two signature curves, which may be easily determined using one dimensional cross-correlation. This procedure is illustrated in the FIGURE.

In generating the signature curve (SC) for a video a data point is computed for each video frame. The value of each data point is computed from the cross-correlation between that frame and a subsequent frame in the video:

$$C(k) = \Sigma_{y=0-Ny-1} \Sigma_{x=0-Nx-1} [l_k(x,y) - {}^*l_k][l_{k+c}(x,y) - {}^*l_{k+c}]$$

where Nx and Ny are the X and Y dimensions of the video frames, c is a constant, $C(k)$ is the cross correlation of frames $l_k$, $l_{k+c}$ to produce the data point on the SC representing the $k^{th}$ frame, and ${}^*l_k$ is the mean luminance value of the $k^{th}$ picture $l_k(x,y)$. The SC not only offers a simple representation of a video, but also provides an important property—its form does not change even if the video is spatially translated, scaled, stretched or undergoes an operation involving any combinations of these. Also the SC is resistant to noise. Although in this example the immediately next frame is used, any subsequent frame may be used as long as the difference in time between frames, i.e., the number of frames, c, is constant.

To further reduce computational cost in interlaced video only the odd or even fields may be used for the SC computation. Also before the computation of the signature curve the frames/fields in the reference and test images may be spatially sampled, i.e., decimated or reduced, to further reduce the computation load.

The length of the SC for a source video may be chosen to be 80 and for a distorted video the length may be chosen to be less, such as 50. The shorter window for the distorted video allows cross-correlation to be evaluated over a range of 15 frames, for this example, at each of the left and right sides. The temporal misalignment of the distorted video from the source video is determined by finding the maximum value of the normalized cross-correlation between the SCs for the respective videos. Because of the aforementioned properties of the SC, the distorted video may contain uncorrected spatial misalignment and other geometrical distortions.

Once the temporal misalignment is determined as described above, the spatial alignment may be estimated using any fast spatial alignment method available in the public domain, such as the phase correlation method. In this way the distorted video is accurately aligned temporally and spatially with the source video so that accurate video quality measurements may be made.

Thus the present invention provides a fast temporal alignment estimation method that converts a distorted video and corresponding source video into respective signature curves, and then cross-correlates the signature curves to determine the temporal misalignment between the videos.

What is claimed is:

1. A method of fast temporal alignment estimation between a distorted video and a corresponding source video comprising the steps of:
    collapsing the distorted and source videos into respective signature curves; and
    matching the respective signature curves to determine a temporal misalignment between the distorted video and source video.

2. The method as recited in claim 1 wherein the collapsing step comprises the step of for each of the distorted and source videos cross-correlating each video frame with a subsequent video frame in the video to compute a data point for such video frame, the data points for all the frames in the video forming the signature curve for the video.

3. The method as recited in claim 2 wherein the cross-correlating step comprises the step of computing each data point according to the equation $$C(k) = \Sigma_{y=0 \to N_y-1} \Sigma_{x=0 \to N_x-1} [l_k(x,y) - {}^*l_k][l_{k+c}(x,y) - {}^*l_{k+c}]$$

where Nx and Ny are the X and Y dimensions of the video frames, c is a constant, C(k) is the data point on the signature curve representing the $k^{th}$ frame, and ${}^*l_k$ is the mean luminance value of the $k^{th}$ picture $l_k(x,y)$.

4. The method as recite in claim 3 wherein c=1.

5. The method as recited in claim 1 further comprising the step of choosing the lengths of the respective signature curves, where the length of the signature curve for the source video is longer than the length of the signature curve for the distorted video.

6. The method as recited in claim 1 wherein the matching step comprises the step of finding a maximum value of a normalized cross-correlation between the signature curves, indicating when the distorted and source videos are temporally aligned.

7. The method as recited in claim 1 further comprising the step of spatially sampling the distorted and source videos prior to the collapsing step.

* * * * *